United States Patent Office 3,454,504
Patented July 8, 1969

3,454,504
OPEN CELL POLYALKYLENE ETHER POLYURETHANE
Korenori Murai, Tokyo, and Kiyo Fukuda, Kenji Saotome, and Shigetake Sato, Yokohama, Japan, assignors of one-half each to Mitsui Chemical Industry Co., Ltd., and Bridgestone Tire Co., Ltd., Tokyo, Japan, both corporations of Japan
No Drawing. Filed Mar. 29, 1965, Ser. No. 443,679
Claims priority, application Japan, Apr. 3, 1964, 39/18,514, 39/18,515, 39/18,516
Int. Cl. C08g 22/44, 41/04
U.S. Cl. 260—2.5                          13 Claims

ABSTRACT OF THE DISCLOSURE

A process for producing polyurethane foams and such foams so produced wherein an organic aromatic polyisocyanate is reacted with a polyalkaline ether polyol in the presence of a catalyst, a blowing agent, a foam stabilizer, and an cell opening agent selected from the group consisting of polypropylene having a viscosity of from 2,000 to 17,000 centistokes at 38° C. and polybutene having a viscosity of from 24 to 300,000 centistokes at 38° C.

---

This invention relates to an improved process for the production of polyurethane foam, and particularly to a process for producing substantially open-celled polyalkylene polyether type polyurethane foam without shrinkage and cracking.

For the convenience of explanation in this specification, the foam having a compressive strength of less than 100 g./cm.$^2$ is referred to as a "flexible" foam, that having a compressive strength in the range of 100–700 g./cm.$^2$, a "semi-rigid" foam and that having a compressive strength greater than 700 g./cm.$^2$, as a "rigid" foam.

In particular, in a one shot method of producing a flexible foam in which arylene diisocyanate, polyalkyleneether polyol and water are reacted at the same time, it is necessary that the reaction should be carried out in the presence as a catalyst of both amine and stannous compound. Since in such method the polymerization and foaming are effected in one stage, the reaction should be strictly controlled. In order to produce a flexible foam of a uniform quality with a good reproducibility, the proportion of mixing these starting materials ought to be precisely restricted. However, especially in a continuous method on the industrial basis, it is difficult to maintain the amount of the catalyst to be fed into the mixing chamber always constant, and some extent of fluctuation cannot be obviated. As a result, the quality of the resulting foam tends to vary, and when it varies to an extreme extent, the foam is often subjected to cracking and shrinkage. The increase of the amount of the stannous compound in particular gives rise to the shrinkage of the foam, and its decrease causes cracks. In addition, the narrowness of the range in which the stannous catalyst is permitted either to increase or to decrease in quantity greatly affects the stability of the operation of the manufacture in accordance with the said known process.

While it is desirable to increase or decrease the compressive strength of the resulting foam by varying the amount of the arylene diisocyanate alone in a predetermined composition of the foam, the allowable range of such variation is considerably narrow and if the amount falls outside this range, the foam will be shrunk or cracked. Thus, by such measure, a possible fluctuation of the compressive strength undergoes a certain limitation. In order to obtain the allowable fluctuation that falls outside the said range, the composition should be basically changed in consideration of the other starting materials also.

The semi-rigid foam, as referred to herein, has been heretofore prepared by the so-called "prepolymer method," that is, a method in which an isocyanate-terminated polymer (prepolymer) is reacted with a cross-linking material under the generation of gas or in the presence of a blowing agent.

For instance, U.S. Patents 2,787,601 and 2,955,091 disclose that such a semi-rigid foam can be prepared by reacting a prepolymer prepared from castor oil and organic isocyanate with water under the generation of carbon dioxide. Further, it is known that adiprene (a prepolymer which is believed to be isocyanate-terminated liquid polymer of polytetramethylene ether glycol is reacted in the presence of the fast curing agent such as methylene bisorthochloroaniline with water as a blowing agent to obtain semi-rigid foam.

However, the semi-rigid foam obtained by the prepolymer from castor oil has a drawback that its physical properties vary considerably in the ambient temperatures.

Adiprene, on the other hand, makes very good semi-rigid foams. However it is too expensive to be used as a raw material for the usual low priced field of application as cushion, insulation, etc.

Production of a polyether type urethane foam whose load bearing property falls approximately into the lower limit of the present urethane foam was attempted with no good results by one-shot process using a mixture of polyol having low hydroxyl number utilized conventionally in making flexible foam and that having higher one for rigid foam. But literature discribes that "as often happens with semi-flexible (corresponds to semi-rigid herein) foam system, open-celled, nonshrinking foam is difficult to reproduce in such a system." (See Saunders and Frisch, "Polyurethanes: Chemistry and Technology, II. Technology," Interscience Publishers, pp. 74–75 (1964).)

Our many experiments confirm that such a system does not permit the preparation of any semi-rigid foam above mentioned, without shrinkage of the cells when cooling.

On the other hand, the rigid foam, as referred to herein, has been prepared by either one-shot or prepolymer process, by the reaction of a polyol having suitably higher hydroxyl number and an organic polyisocyanate. Since resulting foam comprises substantial closed cells, it is not suitable for such applications in which open cell structures are needed, for example, filter for both gas and liquid, sound absorption material and the like.

Therefore, an object of this invention is to provide a process for producing a flexible foam, which makes it possible to extend the allowable range of the amount of the starting materials used which amount fatally affects the foam and to obtain the stability of the operation.

Therefore, another object of this invention is to provide a method of producing an inexpensive semi-rigid foam.

Another object of this invention is to provide a method of preparing easily a nonshrinkable and open celled semi-rigid foam with good reproducibility whose physical properties do not vary substantially in different ambient temperatures.

Still another object of this invention is to provide a process for producing a rigid foam substantially comprising open cells.

It has been discovered that certain hydrocarbons, e.g. liquid polypropylene and polybutene, when it exists as one of the foaming components in the foaming process, especially in the later stage thereof, serves as a cell opening agent, causing the cell membranes of the resulting foam to rupture, thus rendering the foam a property not to shrink during cooling.

It has also been found that foams ranging from flexible to rigid can be prepared by the foaming reaction of polyalkylene ether polyol having hydroxyl number of 40 to 800 with aromatic polyisocyanate in the presence of such a cell opening agent along with conventional adjuvants such as catalyst, blowing agent and foam stabilizer.

Accordingly, this invention is a process for producing polyurethane foam by reacting an organic polyisocyanate with polyalkylene ether polyol in the presence of a catalyst, a blowing agent and a foam stabilizer, which is characterized in that during foaming, a cell opening agent selected from the group consisting of a liquid polypropylene and polybutene.

The polyurethane foam as contemplated by the present invention, are those having continuous cellular structure. The continuous cellular foam is formed in the following manner. Bubbles are formed in polyurethane polymers by means of a carbon dioxide gas generated by the reaction and/or a gas resulting from the vaporization of the auxiliary blowing agent by means of the reaction heat. The cell membrane of polyurethane polymer which surrounds these bubbles and which has grown to a suitable molecular weight ruptures during the later stages of the swelling of the foam and thus renders it possible for the cells to communicate with each other as well as with the outside air. If the cell membranes do not rupture during the later stages of the swelling, the several cells remaining independent of each other and not being in communication, the foam could not withstand an external pressure and hence a violent shrinkage would take place in the foam. The cell opening agent, as used in this invention, is for ensuring that the hereinabove described situation does not occur. During the later stages of the swelling of the foam, this cell opening agent, by weakening portions of the cell membrane of the polyurethane polymer, makes possible the rupture of the cell membrane by the pressure of the bubbles thereby to effect the communication between the cells.

Examples of cell opening agents which are especially effective in the present invention are the polybutenes, the copolymers of n- and iso-butylene (viscosity 24–300,000 centistokes at 38° C.), and the polypropylenes (viscosity 2,000–17,000 centistokes at 38° C.).

The cell opening agent may be used either in the one shot process or the prepolymer process. At any rate, it is needed that such a substance exists in the foaming reaction and especially in the later stage of the foaming reaction.

The amount used of the cell opening agent is suitably 0.1–30 parts by weight, based on 100 parts by weight of the polyalkylene ether polyol in the one shot process and of the prepolymer in the prepolymer process, respectively, particularly preferred being the use of 1–15 parts by weight. The cell opening agent may be added either at the time of foaming or added in advance to the organic polyisocyanate, polyalkylene ether polyol or the reaction adjuvants.

The polyalkylene ether polyol usable in this invention may be various kinds of polyol ranging from diol to octol. They may be those based on a polyhydric alcohol or a polyhydric phenol compound which are obtained by addition polymerizing solely or sucessively an alkylene oxide, such as ethylene oxide, propylene oxide and butylene oxide to the alcohol or the phenol compound, such as ethylene glycol, propylene glycol, glycerin, trimethylol propane, 1,2,6-hexanetriol, pentaerythritol, ethylglucoside, sorbitol, sucrose, polyphenylol propane, polymethylol propane.

In addition to such types of polyols, it is also possible to use those based on an amine such as ethylene diamine and N,N,N',N' - tetrakis(hydroxy - propyl) - ethylene diamine, or an phosphoric or phosphorous acid compound such as phosphoric acid, pyrophosphoric acid, diphosphoric acid, polyphosphoric acid, phosphoric acid, phosphorous acid, and partial ester thereof. Further, the terminal hydroxyl group of the polyether polyol may be that of either a primary or secondary alcohol.

The hydroxyl number of these polyols in this invention may vary from 40 to 800 depending upon the desired stiffness of the resulting foam. It is to be understood, however, that the above specification of hydroxyl number is applied not only to a polyol used singly but also a mixture of two or more polyols of different hydroxyl numbers and number of hydroxyl radicals per molecule. Thus when polyols are used as a mixture, polyol or polyols with a hydroxyl number lower than the specification and/or higher than that can be employed as one or more of its components with good results so long as the hydroxyl number of that mixture complies with the specification.

A hydroxyl number of the mixture is calculated by the following formula:

$$A = \frac{mB + nC + rD + \ldots}{m + n + r + \ldots}$$

wherein $A$ represents a hydroxyl number of the mixture, $m$, $n$ and $r$ . . . each represents amount of the polyols mixed in parts by weight, and $B$, $C$ and $D$ each represents the hydroxyl number of the polyols which are mixed in amount of $m$, $n$ and $r$ . . . parts by weight, respectively.

In order to produce a flexible foam whose compressive strength is less than 100 g./cm.$^2$, a suitable hydroxyl number should range from 40 to 170. As the hydroxyl number increases, the resulting foam comes to have increasing stiffness.

For the production of the semi-rigid foam whose compressive strength is 100 g./cm.$^2$ to 700 g./cm.$^2$, a suitable hydroxyl number ranges from 170 to 300, with increasing stiffness of the resulting foam as the hydroxyl number increases.

When the polyol having from two to four hydroxyl radicals in the molecule is used alone, the shock absorbing property of the resulting foam will be greater. A blend of above polyols in major amount and a polyol having from 6 to 8 hydroxyl radicals will yield a foam which has higher rebounding property.

For the production of the rigid foam whose compressive strength is greater than 700 g./cm.$^2$, suitable range of the hydroxyl numbers is from 300 to 800. The stiffness of the resulting foam increases in general with the increase of the hydroxyl number and the number of hydroxyl radicals in the molecule of the polyol.

The organic polyisocyanate to be reacted in accordance with the invention with the polyalkylene ether polyol, such as hereinabove indicated, is an aromatic one in which molecule two or more isocyanate radicals attach to the aromatic ring. The examples of the polyisocyanate are m-phenylene diisocyanate, p-phenylene diisocyanate, 2,4-tolylene diisocyanate, 2,6-tolylene diisocyanate, a mixture in the ratio by weight of 80:20 of 2,4- and 2,6-tolylenediisocyanates (hereinafter referred to "TDI 80/20"), diphenylmethane-4,4'-diisocyanate, polymethylene polyphenyl isocyanate, 3,3'-dimethyl-diphenyl - 4,4'-diisocyanate, naphthalene-1,5-diisocyanate, so-called "crude TDI" and so-called "crude MDI."

The crude TDI is believed to be a mixture of aromatic polyisocyanates composed of 2,4-tolylene diisocyanate in major amount and some active aromatic polyisocyanates. The crude MDI is also believed as a mixture of aromatic polyisocyanates containing a major amount of diphenyl methane-4,4'-diisocyanate.

Among them TDI 80/20 and crude TDI are preferable in the preparations of the foams ranging from flexible to rigid, but since crude MDI and PAPI have a tendency to yield a foam having greater compressive strength than when said TDI is used, they are usually used in the preparation of semi-rigid or rigid foam.

The amount of the aromatic polyisocyanate to be used may be determined, as known in the art, dependently on its nature and the desired stiffness of the resulting foam. However it lies in general in an amount (equivalent) of 0.7–1.2 times the theoretical amount required for re-acting with the polyalkylene ether polyol and water. The stiffness of the resulting foam increases as this amount gets greater.

The catalysts which are needed in the invention are those known in the art, and one of them is an aliphatic tertiary amine which primarily promotes the reaction be-tween isocyanate and water or acts as curing agent in the absence of water during foaming stage. The examples of such an amines include triethylene diamine, triethyl amine, dimethylethanolamine, ethyl diethanol amine, N,N-dimethyl cyclohexyl amine, N-ethylmorpholine and N-methylmorpholine. Another one is a tin catalyst which catalyses the chain extention of the polyurethane poly-mer. The examples include stannous octoate, stannous oleate, stannous laurate, dibutyl tin di-2-ethyl hexoate, stannous-2-ethyl hexoate and dibutyl tin di-laurate. Among those catalysts especially preferred are stannous octoate, stannous-2-ethyl hexoate, triethylene diamine and dimethyl ethanol amine.

In the foaming stage of producing polyurethane foam, both of the different type catalysts may be used solely or in combination in the one-shot process, but the amine catalyst is ordinarily used in the prepolymer process.

The amount of the catalyst used may be in 0.1 to 1.5 parts by weight for the tin catalyst, and in 0.15 to 1.0 parts by weight for the amine catalyst, both based on 100 parts by weight of the total polyol in case of the one-shot process or by weight of the prepolymer in case of the prepolymer process.

As the blowing agent, these are used substances such as water which reacts with isocyanates to split off carbon dioxide and extend the polymer chain, and volatile hy-drocarbon halides, for example monofluorotrichlorometh-ane, difluorodichloromethane, or dichloromethane. Water and the halide can be used alone, but preferably they are used in combination. The use of water has a tendency to give higher stiffness of the resulting foam.

The amount of the blowing agent used is preferably not more than 5.0 parts by weight of water or not more than 30 parts by weight of the volatile hydrocarbon halide, based on 100 parts by weight of the total polyol in case of the one-shot process or by weight of the prepolymer in case of the prepolymer process.

As the foam stabilizer, any of the commonly used sili-cone oils in the art may be employed in this invention. They are organic silanes or soloxanes, usually silicone-glycol copolymer.

The amount of the foam stabilizer used is between 0.3 and 3.0 parts by weight, based on 100 parts by weight of the total polyol in case of the one shot process or by weight of the prepolymer in case of the prepolymer process.

In accordance with the present invention, the prepara-tion of urethane foam can be carried out by the one-shot process in which the polyol, water or other blowing agent and isocyanates are simultaneously mixed together and allowed to react in the presence of catalyst, cell-opening agent and silicone stabilizer. It is also carried out by the prepolymer or partial prepolymer method wherein the polyol is prereacted with excess isocyanate to provide a reaction product containing free isocyanate groups which is then foamed at a later stage by reaction with additional polyol (cross linker) and water in the presence of catalyst, cell-opening agent and silicone stabilizer. Both polyol and water have active hydrogen to cause chain extention and cross-linking by reacting with isocyanate groups. The preferable range of the free isocyanate contents for semi-rigid foam is 11–15% by weight. As for rigid foam the range is 28–25% by weight.

In both process the foaming reaction may be initiated at room temperature and proceeds while evolving heat and swelling to obtain ultimately a substantial cell open foam which does not shrink after cooling.

So long as the reactants and adjuvants can be uni-formly dispersed, the invention process can be carried out by using any of the conventional apparatuses used in the art. For instance, it is possible to practise the invention batch wise by means of a reaction vessel equipped with high efficiency agitator or to practice it continuously by means of a continuous reaction apparatus which can uni-formly regulate the flow of the reactant solution or dis-persion.

Depending mainly on the hydroxyl number of the poly-alkylene ether polyol used, the compressive strength of the foam obtained by the process of this invention varies from 4 to 700 g./cm.$^2$ at 25% deflection measured by the method of ASTM 1564–59T, or form 700 to 5000 g./cm.$^2$ at 25% deflection measured by the method of ASTM–1621–59T (A). It is feature of the present foam that it comprises substantially open-celled structure that is, over 80% of the foam is constituted of open cells, with a density of less than 0.15 g./cm.$^3$. The semi-rigid foam according to the invention is useful as the cushioning material, such as upholsterings for automobile and furni-ture or gymnastics mat, and the rigid foam is useful as filter material, construction material or sound absorber.

For purpose of illustration only, this invention will now be illustrated by the following examples. Of course, this invention shall not be limited to the following examples. All parts are on a weight basis, unless otherwise indicated.

The data concerning the properties of the foam, as mentioned in the several examples, are measured in the following method.

For flexible and semi-rigid foams, the test methods of ASTM D–1564–59T are adopted, applying sect. 42–46 to the measurement of the density and sect. 30–35 to com-pressive strength at 25% deflection. For rigid foam, the method of ASTM 1622–59T is adopted for the density, and that of ASTM 1621–59T for the compressive strength at 25% deflection.

The open cell fraction in a foam is stated in percent ratio of volume occupied by open cells calculated in terms of the volume of the replacement of air in the foam, meas-ured on a cylindrical test piece foam of 5.0 cm. in height and 7.1 cm./cm.$^2$ in cross-sectional area, utilizing the measurement method proposed by W. T. Remington et al. described in Rubber World, May (1958), p. 261.

Example 1

Eighty parts of polypropylene ether triol with a hy-droxyl number of 170 obtained by the addition polymeri-zation of propylene oxide to trimethylolpropane, 20 parts of polypropylene ether hexol with a hydroxyl number of 490 obtained by the addition polymerization of propylene oxide to sorbitol, 1 part of silicone oil, 0.5 part of stan-nous-2-ethylhexoate, 1.5 parts of water and 10 parts of "polybutene" having a viscosity of 15,000 centistokes at 30° C. are thoroughly mixed at room temperature. When 51.7 parts of TDI 80/20 are added to this mixture and it is agitated for 15 to 20 seconds at the speed of 4,000 r.p.m. The mixture is immediately poured into a cubical paper container whose edge dimension is 17 cm. After the completion of foaming, the foam is cured for 30 min-utes at 110° C. A semi-rigid foam is obtained.

This foam has a density of 0.04 g./cm.$^3$ and a compres-sive strength of 260 g./cm.$^2$. When the same procedure is carried out without the polybutene, a shrinkage of the foam takes place.

Example 2

One hundred parts of polypropylene ether triol with a hydroxyl number of 270 obtained by the addition polymerization of propylene oxide to glycerin is thoroughly mixed at room temperature with 1 part of silicone oil, 0.5 part of stannous-2-ethylhexoate, 1.5 parts of water and 10 parts of polybutene having a viscosity of 200 centistokes at 30° C. When 50 parts of TDI 80/20 is added to this mixture and the procedures as described in Example 1 are followed, a semi-rigid foam is obtained. This foam has a density of 0.04 g./cm.$^3$ and a compressive strength of 390 g./cm.$^2$.

When the same procedures are followed without the addition of polybutene, a shrinkage of the foam takes place.

Example 3

One hundred parts of polypropylene ether triol with a hydroxyl number of 180 obtained by polymerizing propylene oxide to trimethylolpropane is thoroughly mixed at room temperature with 1 part of silicone oil, 1 part of stannous-2-ethylhexoate, 1.5 parts of water and 5.0 parts of polypropylene having a viscosity of 18,000 centistokes at 30° C. when 53.2 parts of crude TDI having 39% NCO content is added to this mixture and the procedures as described in Example 1 are carried out, a semi-rigid foam is obtained. This foam has a density of 0.130 g./cm.$^3$ and a compressive strength of 300 g./cm.$^2$. When the same procedures are followed without the addition of polypropylene, a shrinkage of the foam takes place.

Example 4

Eighty parts of polypropylene ether triol with a hydroxyl number of 160 obtained by polymerizing propylene oxide to glycerin, 20 parts of polypropylene ether hexol with a hydroxyl number of 490 obtained by polymerizing propylene oxide to sorbitol, 1 part of silicone oil, 0.3 part of stannous-2-ethyl hexoate, 10 parts of monofluorotrichloromethane, 3 parts of polypropylene having a viscosity of 5,000 centistokes at 30° are thoroughly mixed at room temperature. When 35.0 parts of TDI 80/20 is added to this mixture and the procedures as described in Example 1 are carried out, a semi-rigid foam is obtained. This foam has a density of 0.100 g./cm.$^3$ and a compressive strength 215 g./cm.$^2$.

When the same procedures are followed without the addition of polypropylene, a shrinkage of the foam takes place.

Example 5

Eighty-four parts of polypropylene ether triol with a hydroxyl number of 160 obtained by polymerizing propylene oxide to glycerin, 16 parts of polypropylene ether octol with a hydroxyl number of 390 obtained by polymerizing propylene oxide to sucrose, 0.5 part of silicone oil, 0.38 part of stannous-2-ethylhexoate, 10 parts of monofluorotrichloromethane and 0.5 part of polybutene having a viscosity of 40 centistokes at 30° C. are thoroughly mixed at room temperature.

When 34.0 parts of TDI 80/20 is added to this mixture and the procedures as described in Example 1 are followed, a semi-rigid foam is obtained. This foam has a density of 0.109 g./cm.$^3$ and a compressive strength of 151 g./cm.$^2$. When the same procedures are carried out without the polybutene, a shrinkage takes place in the foam.

Example 6

Sixty-five parts of polypropylene ether triol with a hydroxyl number of 160 obtained by polymerizing propylene oxide to glycerine, 35 parts of polypropylene ether hexol with a hydroxyl number of 550 obtained by polymerizing propylene oxide to sorbitol 0.5 part of silicone oil, 0.5 part of stannous-2-ethylhexoate, 0.5 part of dimethylethanolamine, 1.5 parts of water and 0.3 part of polybutene having a viscosity of 30 centistokes at 30° C. are thoroughly mixed at room temperature. When 63.5 parts of crude TDI having 38.6% NCO content is added to this mixture and the procedures as described in Example 1 are followed, a semi-rigid foam is obtained. This foam has a density of 0.141 g./cm.$^3$ and a compressive strength of 670 g./cm.$^2$.

When the same procedures are followed without addition of the polybutene, a shrinkage takes place in the foam.

Example 7

44.7 parts of polypropylene ether triol with a hydroxyl number of 56 obtained by polymerizing propylene oxide to glycerin and 14.6 parts of polypropylene ether hexol with a hydroxyl number of 490 obtained by polymerizing propylene oxide to sorbitol are mixed thoroughly with 40.7 parts of TDI 80/20 and cooked for 1.5 hrs. at 90° C.

100 parts of prepolymer is obtained by cooling it to the room temperature. It has a free isocyanate content of 12.0%. 9.0 parts of polypropylene ether hexol with a hydroxyl number of 490 obtained by polymerizing propylene oxide to sorbitol are thoroughly mixed at room temperature with 2 parts of silicone oil, 0.4 part of triethylene diamine, 2.2 parts of water and 1.0 part of polybutene having a viscosity of 40 centistokes at 30° C.

This mixture is added to the above prepolymer and the procedures as described in Example 1 are followed, a semi-rigid foam is obtained. This foam has a density of 0.032 and a compressive strength of 480 g./cm.$^2$.

When the same procedures are carried out without the polybutene, a shrinkage of the foam takes place.

Example 8

One hundred parts of polypropylene ether triol with a hydroxyl number of 180 obtained by polymerizing propylene oxide to glycerin is thoroughly mixed at room temperature with 1 part of silicone oil, 1.5 parts of stannous-2-ethylhexoate, 3.0 parts of water and 5.0 parts of polybutene having a viscosity of 15,000 centistokes at 30° C. When 91.8 parts of crude MDI having 31.4% NCO content is added to this mixture and the operations as described in Example 1 are carried out, a rigid foam is obtained. This foam has a density of 0.098 g./cm.$^3$, a compressive strength of 2280 g./cm.$^2$ and a open cell content of 95.4%.

When the same procedures are followed without the addition of polybutene, a shrinkage takes place in the foam.

Example 9

One hundred parts of polypropylene ether triol with a hydroxyl number of 390 obtained by the addition polymerization of propylene oxide to trimethylolpropane, 1 part of triethylenediamine, 2.0 parts of silicone oil (L–520), 1.5 parts of polybutene having a viscosity of 40 centistokes at 30° C. are thoroughly mixed at room temperature. After adding 80 parts of crude TDI having 39% NCO content to this mixture, it is mixed by agitating for 5 to 10 seconds at the speed of 3000 r.p.m. This mixture is immediately poured into a cubical paper container whose edge dimension is 20 cm. After completion of the foaming the foam is cured overnight at room temperature. The resulting foam has a density of 0.035 g./cm.$^3$, a compressive strength of 1,400 g./cm.$^2$ and an open-cell content of 99.5%. When a foam is made by following the same procedures without the polybutene, the content of open cell is only 8.7%.

Example 10

One hundred parts of polypropylene ether hexol with a hydroxyl number of 490 obtained by the addition polymerization of propylene oxide to sorbitol are thoroughly mixed at room temperature with 2 parts of silicone oil, 0.75 part of stannous-2-ethylhexoate, 30 parts of monofluorotrichloromethane and 2 parts of polybutene having a viscosity of 14,000 centistokes at 30° C. When 100 parts of crude TDI having 39.0% NCO content are added to this mixture and the procedures as Example 14 are followed, a rigid foam is obtained. This foam has a density of 0.044 g./cm.$^3$, a compressive strength of 1500 g./cm.$^2$ and an open-cell content of 100%. When the same operations are followed without the polybutene, the open-cell content is only 5.5%.

Example 11

One hundred parts of polypropylene ether octol with a hydroxyl number of 380 obtained by the addition polymerization of propylene oxide to sucrose are thoroughly mixed at room temperature with 2 parts of silicone oil, 1.2 parts of stannous-2-ethylhexoate, 30 parts of monofluorotrichloromethane and 0.15 part of polypropylene having a viscosity of 5,000 centistokes at 30° C. When 100 parts of crude MDI having 29% NCO content are added to this mixture and the procedures as described in Example 14 are followed, a rigid foam is obtained. This foam has a density of 0.033 g./cm.$^3$, a compressive strength of 1,500 g./cm.$^3$ and an open-cell content of 99.8%. When the same procedures are followed without the polypropylene, the content of open cell is only 4.9%.

Example 12

One hundred parts of polypropylene ether hexol with a hydroxyl number of 490 are thoroughly mixed with 2 parts of silicone oil, 0.3 part of stannous-2-ethylhexoate, 27 parts of monofluorotrichloromethane and 1 part of polybutene having a viscosity of 40 centistokes at 30° C. When 80 parts of TDI 80/20 are added to this mixture and the procedures as described in Example 14 are carried out, a rigid foam is obtained. This foam has a density of 0.024 g./cm.$^3$, a compressive strength of 1,100 g./cm.$^2$ and an open-cell content of 99.1%.

When the same operations are carried out without the polybutene, the content of open cell is only 6.2%.

Example 13

22.5 parts of polypropylene ether triol with a hydroxyl number of 440 obtained by the addition polymerization of propylene oxide to trimethylolpropane are mixed with 77.5 parts of TDI 80/20 till the completion of exotherm, heated for 1.5 hours at a temperature of 80 to 100° C., and cooled to the room temperature. 100 parts of the partial prepolymer is obtained. It has a free NCO content of 30%.

2 parts of polypropylene having a viscosity of 18,000 centistokes at 30° C. is added to this partial prepolymer. 86.4 parts of polypropylene ether triol with a hydroxyl number of 440 obtained by the addition polymerization of propylene oxide to trimethylolpropane are mixed with 1.6 parts of silicone oil, 0.5 part of triethylene diamine and 30 parts of monofluorotrichloromethane at room temperature. This mixture is then thoroughly mixed with above partial prepolymer for 5 to 10 seconds at an agitation speed of 4000 r.p.m. and immediately poured into a cubical paper container whose edge dimension is 20 cm.

After completion of the foaming, the foam is cured for 1 hr. at 70° C. The resulting foam has a density of 0.041 g./cm.$^3$, a compressive strength of 1,100 g./cm.$^2$ and an open-cell content of 89.3%. When a foam is made by the same procedures without the polypropylene, the content of open cell is only 4.7%.

Example 14

21.2 parts of polypropylene ether hexol with a hydroxyl number of 495 obtained by the addition polymerization of propylene oxide to sorbitol is thoroughly mixed with 78.8 parts of TDI 80/20 till the completion of exotherm and cooked for 1.5 hrs. at a temperature of 80° to 100° C. After cooling, 100 parts of the partial prepolymer is obtained. It has a free isocyanate content of 29.3%. 77.2 parts of polypropylene ether hexol with a hydroxyl number of 495 obtained by the addition polymerization of propylene oxide to sorbitol are mixed at room temperature with 1.5 parts of silicone oil, 0.5 parts of triethylene diamine, 29 parts of monofluorotrichloromethane and 1 part of polybutene having a viscosity of 40 centistokes at 30° C.

The above partial prepolymer is added to this mixture and the operations as described in Example 19 are carried out, a rigid foam is obtained. This foam has a density of 0.044 g./cm.$^3$, a compressive strength of 1,600 g./cm.$^2$ and a open-cell content of 91.0%. When the same procedures are followed without the polybutene, the content of open cell is only 7.8%.

Example 15

A hundred parts of polypropylene ether triol with a hydroxyl number of 160 obtained by polymerizing propylene oxide to trimethylol propane, 1.8 parts of silicone oil, 20 parts of monofluorotrichloromethane, 0.15 part of triethylene diamine, and 4 parts of water are mixed at room temperature with other foaming ingredients except TDI 80/20 in accordance with the formulations described in Table 1. TDI 80/20 is agitated with this mixture and poured into a paper container. The amount of TDI 80/20 and the properties of supersoft flexible foams obtained are also shown in this table.

TABLE 1

| | TDI 80/20 (Equivalents) | Catalyst [1] | Polybutene [2] | Foam property | |
|---|---|---|---|---|---|
| | | | | Appearance | Comp. strength |
| Number: | | | | | |
| 1 | 44.3 (0.70) | 0.08 | None | Blow | |
| 2 | 44.3 (0.70) | 0.13 | do | Good | 4.9 |
| 3 | 44.3 (0.70) | 0.15 | do | Shrink | |
| 4 | 44.3 (0.70) | 0.20 | 5.0 | Blow | |
| 5 | 44.3 (0.70) | 0.25 | 5.0 | Good | 6.2 |
| 6 | 44.3 (0.70) | 0.48 | 5.0 | do | 6.5 |
| 7 | 44.3 (0.70) | 0.53 | 5.0 | Shrink | |
| 8 | 47.5 (0.75) | 0.13 | None | do | |
| 9 | 44.3 (0.70) | 0.13 | do | Good | 5.2 |
| 10 | 50.7 (0.80) | 0.13 | do | do | 11.5 |
| 11 | 57.0 (0.90) | 0.13 | 10.0 | do | 19.1 |

[1] Stannous-2-ethylhexoate is used as the catalyst.
[2] Polybutene with a viscosity of 1,400 centistokes at 30° C.

Example 16

Seventy parts of polypropylene ether triol with a hydroxyl number of 56 obtained by polymerizing propylene oxide to glycerin, 30 parts of polypropylene ether triol with a hydroxyl number of 160 obtained by polymerizing propylene oxide to glycerin, 1.0 part of silicone oil, 0.15 part of triethylene diamine and 3.5 parts of water are mixed at room temperature with other foaming ingredients except TDI 80/20 in accordance with formulations described in Table 2. TDI 80/20 is agitated with this mixture and poured into a paper container. The amount of TDI 80/20 and the properties of flexible foams obtained are also shown in this table.

TABLE 2

| Number | TDI 80/20 (Equivalents) | Catalyst[1] | Polybutene[2] | Foam property Appearance | Comp. strength |
|---|---|---|---|---|---|
| 1 | 47.3 (1.0) | 0.05 | None | Blow | |
| 2 | 47.3 (1.0) | 0.10 | do | Good | 43.4 |
| 3 | 47.3 (1.0) | 0.20 | do | do | 53.6 |
| 4 | 47.3 (1.0) | 0.25 | do | Shrink | |
| 5 | 47.3 (1.0) | 0.15 | 3.0 | Good | 41.2 |
| 6 | 47.3 (1.0) | 0.40 | 3.0 | do | 47.2 |
| 7 | 37.8 (0.8) | 0.25 | None | Blow | |
| 8 | 42.6 (0.9) | 0.25 | do | Good | 24.0 |
| 9 | 37.8 (0.8) | 0.25 | 5.0 | Blow | |
| 10 | 42.6 (0.9) | 0.25 | 5.0 | Good | 27.8 |
| 11 | 56.7 (1.2) | 0.25 | 5.0 | do | 87.5 |

[1] Stannous-2-ethylhexoate is used as the catalyst.
[2] Polybutene with a viscosity of 40 centistokes at 30° C.

The allowable range of the catalyst level is remarkably extended by the use of polybutene. The approvable limit of the TDI equivalents can be extended to the level of 1.2 by the use of polybutene and a stiffer flexible foam with a compressive strength of 87.5 g./cm.² can be obtained as shown in No. 11 in this table.

Example 17

Eighty parts of polypropylene ether triol with a hydroxyl number of 60 obtained by polymerizing propylene oxide to glycerin, 20 parts of polypropylene ether triol based on glycerin with a hydroxyl number of 160, 10 parts of polybutene with a viscosity of 10,000 centistokes at 30° C., 0.6 part of stannous-2-ethylhexoate, 0.2 part of triethylene diamine, 1.5 parts of silicone oil, and 4.0 parts of water are thoroughly mixed at the room temperature.

When 57.5 parts of TDI 80/20 are added to this mixture, agitated vigorously for a few seconds and poured into a paper container, a flexible foam with a compressive strength of 90 g./cm.² is obtained. The foam is drastically shrunk when the same procedures are carried out without polybutene.

What we claim is:

1. In a process for producing polyurethane foam by reacting an organic aromatic polyisocyanate with a polyalkylene ether polyol in the presence of a catalyst, a blowing agent and a foam stabilizer, the improvement which comprises additionally employing a cell opening agent selected from the group consisting of polypropylene having a viscosity of from 2,000 to 17,000 centistokes at 38° C. and polybutene having a viscosity of from 24 to 300,000 centistokes at 38° C.

2. The improved process in accordance with claim 1 wherein a polyalkylene ether polyol, stannous catalyst, water, silicone oil foam stabilizer, cell opening agent and aromatic polyisocyanate are simultaneously mixed whereby the reaction of said polyisocyanate, said polyalkylene ether polyol and water is effected in the presence of said cell opening agent, catalyst, blowing agent and foam stabilizer to yield a foam, said polyalkylene ether polyol having a hydroxyl number of 40 to 170 and said aromatic polyisocyanate being arylene diisocyanate.

3. A process for producing a substantially open celled polyurethane foam having a density of not more than 0.15 g./cm.³ and a compressive strength of at least 100 g./cm.³, which comprises reacting a polyalkylene ether polyol having a hydroxyl number of 170 to 800 with an aromatic polyisocyanate and foaming the reaction mixture in the presence of (1) a cell opening agent selected from the group consisting of polypropylene having a viscosity of from 2,000 to 17,000 centistokes at 38° C. and polybutene having a viscosity of from 24 to 300,000 centistokes at 38° C., (2) a catalyst, (3) a blowing agent and (4) a foam stabilizer.

4. The process according to claim 3 wherein, said polyalkylene ether polyol comprises a substance obtained by addition polymerizing an alkylene oxide and the mixtures thereof and a polyhydric alcohol selected from the group consisting of propylene glycol, glycerin, trimethylol propane, sorbitol and sucrose.

5. The process according to claim 3 wherein said aromatic polyisocyanate is selected from the group consisting of 2,4-tolylene diisocyanate, 2,6-tolylene diisocyanate, diphenyl methane-4,4'-diisocyanate and polymethylene polyphenyl isocyanate.

6. The process according to claim 3 wherein the catalyts is selected from the group consisting of organic tin compounds which catalyze the chain extention of the polyurethane polymer and aliphatic tertiary amines which promote the reaction between isocyanate and water.

7. The process according to claim 6 wherein said tin compound is selected from the group consisting of a stannous and a dibutyl stannic salt of the fatty acid having 6 to 12 carbon atoms.

8. The process according to claim 6 wherein said aliphatic tertiary amine is selected from the group consisting of dimethyl ethanol amine and triethylene diamine.

9. The process according to claim 3 wherein said blowing agent is selected from the group consisting of water and volatile hydrocarbon halides.

10. A process for producing a substantially open celled polyurehtane foam having a density of not more than 0.15 g./cm.³ and a compressive strength of at least 100 g./cm.³, which comprises mixing a polyalkylene ether polyol having a hydroxyl number of 170 to 800, an aromatic polyisocyanate, a cell opening agent, a catalyst, a blowing agent and a foam stabilizer, thus causing said polyisocynate to react with said polyalkylene ether polyol in the presence of said cell opening agent, said catalyst, said blowing agent and said foam stabilizer, and resulting in foam formation, said cell opening agent being selected from the group consisting of polypropylene having a viscosity of from 2,000 to 17,000 centistokes at 38° C. and polybutene having a viscosity of from 24 to 300,000 centistokes at 38° C.

11. The process according to claim 10 wherein 0.1–30 parts by weight of said cell opening agent is used per 100 parts by weight of said polyalkylene ether polyol.

12. A process for producing a substantially open celled polyurethane foam having a density of not more than 0.15 g./cm.³ and a compressive strength of at least 100 g./cm.³, which comprises reacting a polyalkylene ether polyol having a hydroxyl number of 170 to 800 with excess of an aromatic polyisocyanate and foaming by mixing the reaction mixture with said polyalkylene ether polyol in the presence of (1) a cell opening agent selected from the group consisting of polypropylene having a viscosity of from 2,000 to 17,000 centistokes at 38° C., and polybutene having a viscosity of from 24 to 300,000 centistokes at 38° C., (2) a catalyst, (3) a blowing agent and (4) a foam stabilizer.

13. The process according to claim 12 wherein 0.1–30 parts by weight of said cell opening agent is used per 100 parts by weight of said polyalkylene ether polyol.

References Cited

UNITED STATES PATENTS

| | | | |
|---|---|---|---|
| 2,577,381 | 12/1951 | Stirnemann | 260—2.5 |
| 2,591,884 | 4/1952 | Simon et al. | 260—2.5 |
| 2,921,039 | 4/1957 | McKay et al. | 260—2.5 |
| 2,962,455 | 11/1960 | Hostettler et al. | 260—2.5 |
| 3,085,983 | 4/1963 | Hardy | 260—2.5 |
| 3,165,483 | 1/1965 | Gemeinhardt et al. | 260—2.5 |
| 3,190,842 | 6/1965 | Ringwood et al. | 260—2.5 |
| 3,201,359 | 8/1965 | Herrick et al. | 260—2.5 |
| 3,270,032 | 8/1966 | Erner | 260—326.5 |
| 3,294,711 | 12/1966 | von Bonin | 260—2.5 |
| 3,314,903 | 4/1967 | Belak et al. | 260—2.5 |
| 3,317,479 | 5/1967 | Noshay et al. | 260—77.5 |

FOREIGN PATENTS

| | | |
|---|---|---|
| 850,162 | 9/1960 | Great Britain. |
| 852,379 | 10/1960 | Great Britain. |
| 923,643 | 4/1963 | Great Britain. |
| 1,065,962 | 8/1965 | Germany. |

OTHER REFERENCES

Morrell (editor): Synthetic Resins and Allied Plastics, 3rd edition, Oxford University Press, London (1951), pp. 374 to 380; 689–691.

HOSEA E. TAYLOR, JR., *Primary Examiner.*

H. S. COCKERAM, *Assistant Examiner.*

U.S. Cl. X.R.

260—77.5, 859

UNITED STATES PATENT OFFICE
CERTIFICATE OF CORRECTION

Patent No. 3,454,504                            July 8, 196

Korenori Murai et al.

It is certified that error appears in the above identified patent and that said Letters Patent are hereby corrected as shown below:

Column 2, line 18, capitalize "Adiprene". Column 5, line 57, "soloxanes" should read -- siloxanes --. Column 10, line 61, before "Example 16" insert as a new paragraph:--The allowable range of the catalyst level and that of the TDI equivalent in the foaming can be extended by the use of polybutene. --. Column 12, line 44, "polyurehtane" should rea -- polyurethane --.

Signed and sealed this 5th day of May 1970.

(SEAL)

Attest:

Edward M. Fletcher, Jr.                        WILLIAM E. SCHUYLER, JR.

Attesting Officer                                       Commissioner of Patents